Patented May 10, 1949

2,470,070

UNITED STATES PATENT OFFICE 2,470,070

PROCESS FOR THE MANUFACTURE OF 2,5 DIMETHYLFURAN AND ACETONYLACETONE

Ian M. Heilbron and Ewart R. H. Jones, London, England

No Drawing. Application January 25, 1947, Serial No. 724,474. In Great Britain January 28, 1946

18 Claims. (Cl. 260—345)

This invention relates to an improved process for the preparation of acetonylacetone and 2:5-dimethylfuran.

We have found that hex-3-en-5-yn-2-ol yields acetonylacetone when it is subjected to an hydration treatment and that 2:5-dimethylfuran is formed, presumably as an intermediate product, of the hydration reaction.

According to the present invention, there is provided a process for the manufacture of 2:5-dimethylfuran which comprises subjecting hex-3-en-5-yn-2-ol to the action of heat in the presence of a mercuric catalyst. The presence of dilute acids, such as dilute aqueous sulphuric acid, is found to be advantageous.

The strength of the sulphuric acid is preferably between about 0.1% and 10% by weight.

The reaction may be carried out in the presence of an inert organic diluent. The diluent is preferably a lower aliphatic alcohol, such as methyl alcohol whilst aqueous alcohols such as aqueous ethyl alcohol may also be used. As catalyst, mercuric salts, e. g. mercuric sulphate, may be used, which may, of course, be formed in situ by the interaction of a suitable acid e. g. sulphuric acid, upon mercuric oxide or a mercuric salt, such as mercuric chloride.

It is a feature of the invention to effect the reaction in the presence of a mercuric oxide-boron trifluoride catalyst, in which case the reaction proceeds advantageously in the absence of water. Substantially water-free diluents may however be used, such as methyl alcohol, which is particularly suitable for this purpose. The mercuric oxide-boron trifluoride catalyst and its preparation have been described by Hennion and Lieb in the Journal of the American Chemical Society 1944, volume 66, page 1289.

The hex-3-en-5-yn-2-ol serving as starting material for the reaction may be formed by the isomerisation of propenylethynyl carbinol by heating in the presence of a dilute acid as described by Jones and McCombie, Journal of the Chemical Society, London, 1943, at page 261.

The reaction temperatures used for the hydrolytic treatment and the formation of 2:5-dimethylfuran are moderate, temperatures of 50° to 100° C. being particularly satisfactory.

A further feature of the invention consists in that the hydration is effected in an inert atmosphere, for example nitrogen.

The 2:5-dimethylfuran produced by the hydration treatment can be separated from the reaction mixture by steam distillation preferably as soon as it is formed. For example a slow current of steam can be passed into the reaction mixture to serve the dual purpose of supplying the heat required for the reaction and for distilling off the dimethylfuran as it is formed.

From the 2:5-dimethylfuran resulting from the process of the invention, acetonylacetone may be produced by hydrolysis as is well known, e. g., by heating with a dilute aqueous acid medium. The hydrolysis proceeds in this case in the absence of mercuric salts.

The invention also comprises the manufacture of acetonylacetone by the hydration of hex-3-en-5-yn-2-ol in a single stage process. This process comprises the prolonged heating of said hexenynol with a mercuric catalyst in a dilute aqueous acid medium whereby the 2:5-dimethylfuran first formed is hydrolysed. As a modification of the manufacture of acetonylacetone in a single stage process, propenylethynyl carbinol is isomerised to the hexenynol, as above mentioned, and on heating the reaction mixture in the presence of mercuric salts the hydration of the latter substance to either 2:5-dimethylfuran, or directly to acetonylacetone is achieved in the same reaction mixture.

The several reactions discussed above may readily be appreciated from the following equations:

(1) $$CH_3-CH=CH-CH(OH)-C\equiv CH \xrightarrow{\text{isomerisation}} CH_3-CH(OH)-CH=CH-C\equiv CH$$

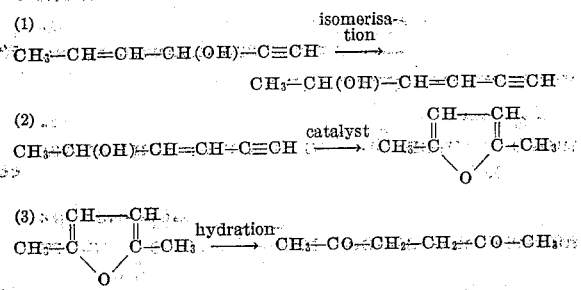

(2) $$CH_3-CH(OH)-CH=CH-C\equiv CH \xrightarrow{\text{catalyst}} CH_3-C\underset{O}{\overset{CH=CH}{\diagup\!\!\diagdown}}C-CH_3$$

(3) $$CH_3-C\underset{O}{\overset{CH=CH}{\diagup\!\!\diagdown}}C-CH_3 \xrightarrow{\text{hydration}} CH_3-CO-CH_2-CH_2-CO-CH_3$$

in which Equation 1 illustrates the isomerisation of propenylethynyl carbinol to the hexenynol, Equation 2 illustrates the conversion of the hexenynol to the dimethylfuran and Equation 3 illustrates the hydration of the dimethylfuran to acetonylacetone; it will be appreciated that the reactions illustrated by Equations 2 and 3 may occur simultaneously in the reaction mixture leading to the production of acetonylacetone without isolation of the dimethylfuran which, as already indicated, is presumed to be an intermediate reaction product.

The following examples illustrate various ways in which our invention may be carried into effect:

*Example 1.*—A mixture of 107 g. of hex-3-en-5-yn-2-ol, 2 g. of mercuric sulphate and 400 ccs. of a 2% weight by volume aqueous solution of sulphuric acid was heated on a steam bath with vigorous stirring in an atmosphere of nitrogen for 4½ hours when it became homogeneous to produce acetonylacetone. After saturation of the reaction mixture with salt the product was extracted with ether and, on working up the extract, a yield of 72 g. of acetonylacetone was obtained.

*Example 2.*—A mixture of 102 g. of propenylethynyl carbinol and 400 ccs. of a 2% weight by volume aqueous solution of sulphuric acid was heated on a steam bath with vigorous stirring in an atmosphere of nitrogen for 30 minutes to form hex-3-en-5-yn-2-ol. After the addition of 2.0 g. of mercuric sulphate, the heating and stirring were continued for a further 2½ hours to form acetonylacetone. Working up the reaction mixture as described in Example 1 furnished 67 g. of the acetonylacetone.

*Example 3.*—Steam was passed slowly into a mixture of 104 g. of hex-3-en-5-yn-2-ol, 2.0 g. of mercuric sulphate and 400 ccs. of a 0.5% weight by volume aqueous solution of sulphuric acid until the distillate no longer separated into two layers. The upper layer of the distillate was separated off, dried over calcium chloride and distilled to yield 46 g. of 2:5-dimethylfuran. The 2:5-dimethylfuran thus obtained was hydrolysed in the well known manner to produce acetonylacetone.

*Example 4.*—A solution of 200 g. of hex-3-en-5-yn-2-ol and 15 g. mercuric chloride in 600 ccs. of water and 550 ccs. of ethyl alcohol was stirred and heated on a steam bath in such a manner as to maintain a slow rate of distillation. After 2 hours a further quantity of 15 g. of mercuric chloride was added and the distillation continued until the distillate no longer separated into two layers on dilution with water. The distillate was poured into brine and the upper layer separated and washed with water. Distillation gave 114 g. of 2:5-dimethylfuran.

*Example 5.*—A catalyst, prepared by heating together, for a few minutes, a mixture of 20 g. of mercuric oxide, 8 ccs. of boron trifluoride-ether complex, 8 ccs. of methyl-alcohol and a few crystals of trichloroacetic acid, was dissolved in 800 ccs. of methyl alcohol and a solution of 330 g. of hex-3-en-5-yn-2-ol in 800 ccs. of methyl alcohol was added during a period of an hour the mixture being maintained at 50°–55° C. Stirring was continued for a further hour at this temperature, and thereafter 50 g. of powdered potassium carbonate was added and after 30 minutes the solid material was allowed to settle. The decanted solution was then carefully fractionated through an 18 inch column packed with glass helices and the fraction boiling at 61°–65° C. was freed from methyl alcohol by washing with water. After drying with calcium chloride, the product was distilled and yielded 90 g. of 2:5 dimethylfuran. 120 g. of hex-3-en-5-yn-2-ol, which had not reacted, were recovered.

*Example 6.*—10 g. of hex-3-en-5-yn-2-ol were heated with 40 ccs. of a 10% weight by volume aqueous solution of sulphuric acid with vigorous stirring on a steam bath for 3 hours. 5 g. of somewhat impure acetonylacetone were obtained.

What we claim is:

1. A process for the manufacture of 2:5 dimethylfuran which comprises subjecting hex-3-en-5-yn-2-ol to the action of heat at a temperature not exceeding 100° C. in the presence of an inorganic mercuric catalyst.

2. A process for the manufacture of 2:5 dimethylfuran which comprises subjecting hex-3-en-5-yn-2-ol to the action of heat at a temperature not exceeding 100° C. in the presence of an inorganic mercuric salt and in the presence of a dilute aqueous acid without substantial hydrolysis.

3. A process for the manufacture of 2:5 dimethylfuran which comprises subjecting hex-3-en-5-yn-2-ol to the action of heat at a temperature not exceeding 100° C. in the presence of an inorganic mercuric acatalyst and in the presence of a lower aliphatic alcohol as diluent.

4. A process for the manufacture of 2:5 dimethylfuran which comprises subjecting hex-3-en-5-yn-2-ol, in solution in a lower aliphatic alcohol, to the action of heat at a temperature not exceeding 100° C. in the presence of an inorganic mercuric catalyst and in the presence of a dilute aqueous acid without substantial hydrolysis.

5. A process for the manufacture of 2:5 dimethylfuran which comprises heating a solution of hex-3-en-5-yn-2-ol in methyl alcohol with dilute aqueous sulphuric acid at a temperature not exceeding 100° C. in the presence of an inorganic mercuric salt as catalyst.

6. A process for the manufacture of 2:5 dimethylfuran which comprises subjecting hex-3-en-5-yn-2-ol to the action of heat in the presence of an inorganic mercuric catalyst at a temperature of 50° to 100° C.

7. A process for the manufacture of 2:5 dimethylfuran which comprises heating a solution of hex-3-en-5-yn-2-ol in methyl alcohol with dilute aqueous sulphuric acid in the presence of an inorganic mercuric salt as catalyst at a temperature of 50° to 100° C.

8. A process for the manufacture of 2:5 dimethylfuran which comprises heating an anhydrous reaction mixture comprising hex-3-en-5-yn-2-ol and a mercuric oxide-boron trifluoride catalyst at a temperature of 50° to 100° C.

9. A process for the manufacture of 2:5 dimethylfuran which comprises subjecting hex-3-en-5-yn-2-ol to the action of steam in the presence of an inorganic mercuric salt and recovering 2:5 dimethylfuran from the steam distillate.

10. A process for the manufacture of acetonylacetone which comprises heating a dilute aqueous medium containing hex-3-en-5-yn-2-ol at a temperature not exceeding 100° C. in the presence of an inorganic mercuric catalyst.

11. A process for the manufacture of acetonylacetone which comprises heating a dilute aqueous acid medium containing hex-3-en-5-yn-2-ol at a temperature not exceeding 100° C. in the presence of an inorganic mercuric catalyst.

12. A process for the manufacture of acetonylacetone which comprises heating a dilute aqueous acid medium containing hex-3-en-5-yn-2-ol at a temperature not exceeding 100° C. in the presence of an inorganic mercuric salt.

13. A process for the manufacture of acetonylacetone which comprises heating a dilute aqueous acid medium containing hex-3-en-5-yn-2-ol in the presence of an inorganic mercuric salt at a temperature of 50° to 100° C.

14. A process for the manufacture of acetonylacetone which comprises heating a dilute aqueous acid medium containing hex-3-en-5-yn-2-ol in the presence of an inorganic mercuric salt at a temperature of 50° to 100° C. in an inert atmosphere.

15. A process for the manufacture of acetonylacetone which comprises heating a dilute aqueous acid medium containing hex-3-en-5-yn-2-ol at a temperature not exceeding 100° C. in the presence of an inorganic mercuric catalyst in an atmosphere of nitrogen.

16. A process for the manufacture of acetonylacetone which comprises heating hex-3-en-5-yn-2-ol with a dilute aqueous sulphuric acid of a concentration of 0.1 to 10% by weight at a temperature of 50° to 100° C. in the presence of an inorganic mercuric catalyst.

17. A process for the manufacture of acetonylacetone which comprises heating hex-3-en-5-yn-2-ol with a dilute aqueous sulphuric acid of a concentration of 0.1 to 10% by weight in an inert atmosphere at a temperature of 50° to 100° C. in the presence of an inorganic mercuric catalyst.

18. A process for the manufacture of acetonylacetone which comprises heating hex-3-en-5-yn-2-ol with a dilute aqueous sulphuric acid of a concentration of 0.1 to 10% by weight in an inert atmosphere at a temperature of 50° to 100° C. in the presence of a mercuric oxide-boron trifluoride catalyst.

IAN M. HEILBRON.
EWART R. H. JONES.

REFERENCES CITED

The following references are of record in the file of this patent:

UNITED STATES PATENTS

| Number | Name | Date |
|---|---|---|
| 2,010,076 | Groll et al. | Aug. 6, 1935 |
| 2,052,652 | Perkins et al. | Sept. 1, 1936 |
| 2,263,378 | Carter | Nov. 18, 1941 |

OTHER REFERENCES

Morton, Chemistry of Heterocyclic Compounds, page 3, 2nd. printing, McGraw-Hill Book Co. Inc., New York and London, 1946.

Spielman, Richter's Organic Chemistry, vol. 1, page 351, P. Blakiston's Son and Co., Philadelphia 1919.

Jones et al., Journal of the Chemical Society, London, 1943, page 261.